F. N. WINDRIDGE.
INDICATING APPARATUS FOR GASOLENE TANKS, &c.
APPLICATION FILED DEC. 28, 1915.
1,253,324.
Patented Jan. 15, 1918.
2 SHEETS—SHEET 2.
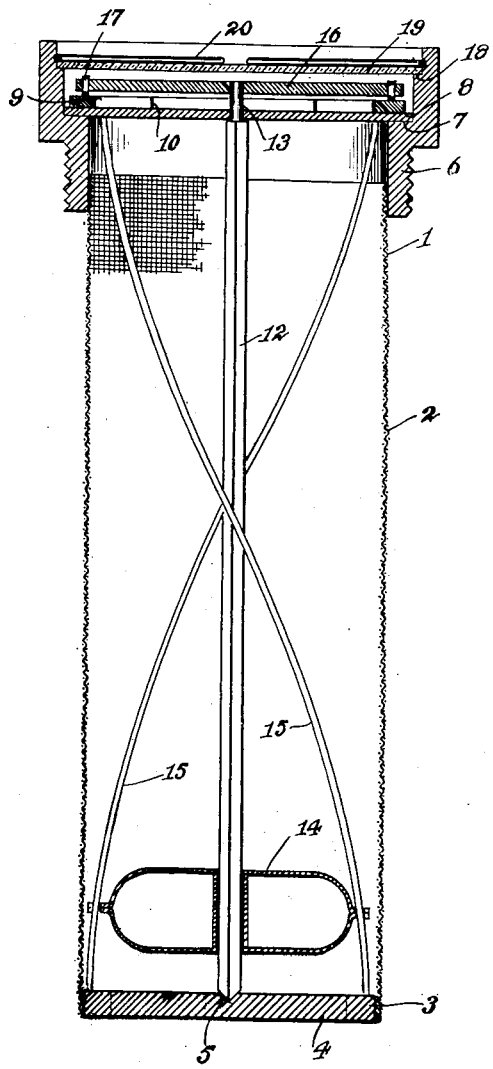
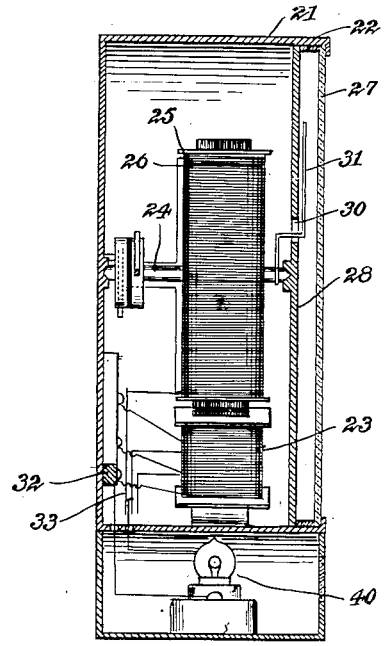
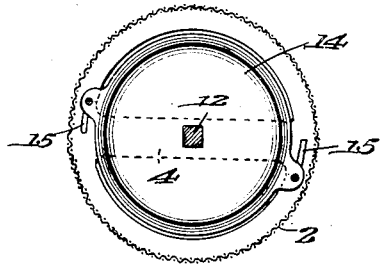
Witnesses
E. B. Ward
Inventor
Frederick N. Windridge
By John J. McCarthy
Attorney.

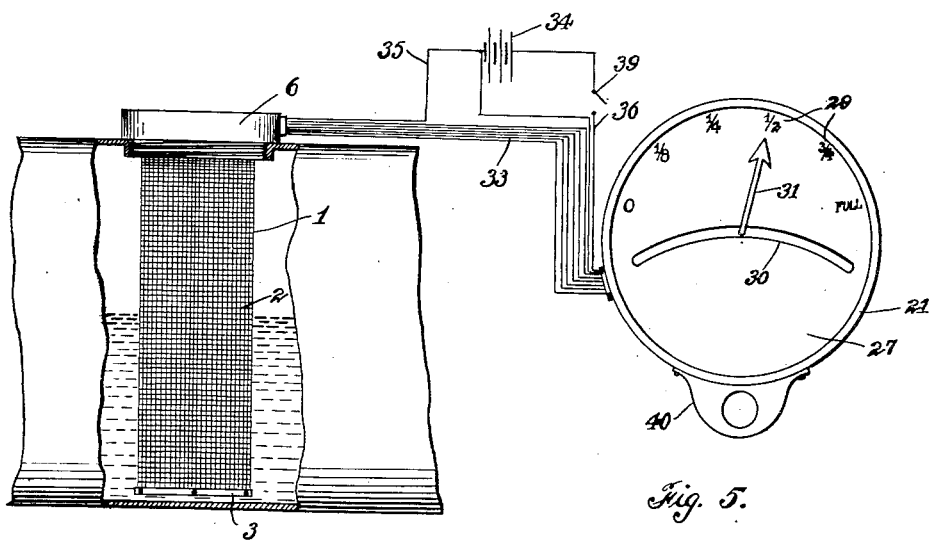
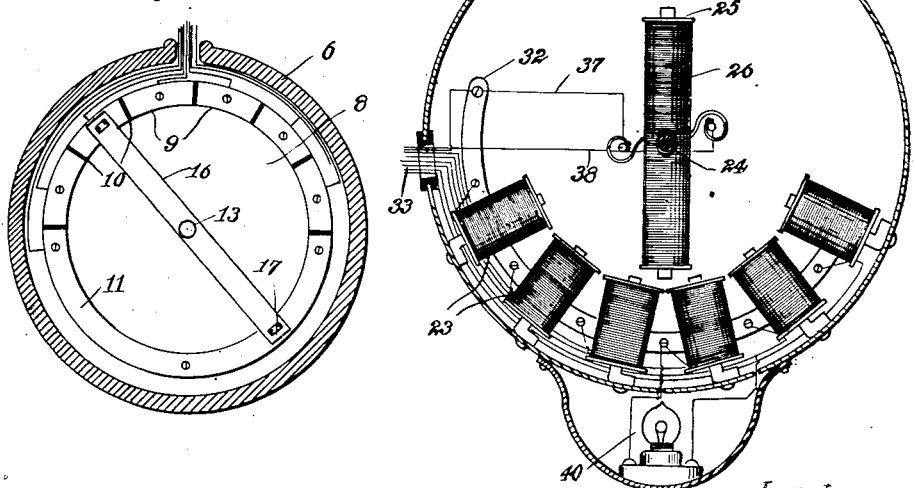

UNITED STATES PATENT OFFICE.

FREDERICK N. WINDRIDGE, OF CHERRYDALE, VIRGINIA, ASSIGNOR OF ONE-THIRD TO JOHN S. WARD, OF CHERRYDALE, VIRGINIA.

INDICATING APPARATUS FOR GASOLENE-TANKS, &c.

1,253,324.    Specification of Letters Patent.    Patented Jan. 15, 1918.

Application filed December 28, 1915. Serial No. 69,013.

*To all whom it may concern:*

Be it known that I, FREDERICK N. WINDRIDGE, a citizen of the United States, residing at Cherrydale, Virginia, have invented certain new and useful Improvements in Indicating Apparatus for Gasolene-Tanks, &c., of which the following is a specification.

My present invention relates to certain novel and useful improvements in indicating apparatus for use in connection with fluid tanks and is especially adapted for use in connection with the gasolene tanks of motor vehicles to indicate the quantity of gasolene in the tank.

In carrying out the present invention, I employ a float actuated circuit closer located in the fluid tank on the motor vehicle and adapted to be actuated with the rise and fall of the fluid, and an indicator arranged within the vision of the attendant of the tank. The circuit closer is of novel construction and includes a bridging finger under the control of the float in the tank and rotatable in the movement of the float, and a plurality of contact segments arranged in a partially circular row and a partly circular strip forming the other part of the circle defined by the contacts. The bridging strip has one end normally engaging the partly circular strip and the other end adapted to engage the contact segments successively in the movements of the float so as to electrically connect the segments to the strip successively.

In the present instance, the indicator associated with the circuit closer embodies a number of electro-magnets connected in circuit with the corresponding contact segments of the circuit closer respectively, an electro-magnet pivoted upon an axis and under the influence of the first-mentioned magnets and carrying an indicator hand and connected in circuit with the source of energy of the system. As the magnets of the indicator are energized incident to the movement of the bridging strip over the contact segments and the contact strip of the circuit closer, the indicator finger is swung to a position corresponding to the position of the float in the tank, thereby indicating to the attendant the amount of fluid in the tank.

The gist of my invention resides in the peculiar construction of the circuit closer and particularly to the connection between the float and the bridging strip whereby the latter is rotated to operate the indicator in the movements of the float.

My invention consists in the construction, combination and arrangement of parts hereinafter set forth in and falling within the scope of the claims.

In the accompanying drawings:

Figure 1 is a diagrammatic view of an indicating system constructed in accordance with my present invention.

Fig. 2 is an enlarged vertical sectional view through the circuit closer.

Fig. 3 is a horizontal sectional view therethrough.

Fig. 4 is a horizontal sectional view through the indicator showing the electro-magnets in elevation.

Fig. 5 is a vertical sectional view through the indicator.

Fig. 6 is a horizontal sectional view through the casing, showing the angular section of the shaft.

Referring now to the drawings in detail, 1 designates a float actuated circuit closer adapted to be placed in a gasolene tank or other fluid container. This circuit closer comprises a foraminous cylindrical body 2 adapted to be arranged vertically within the tank and secured to the lower end of the body 2 is a ring 3 formed with a cross bar 4 extending across the ring and formed centrally with a bearing recess 5. Surrounding the upper end of the foraminous body 2 and suitably secured thereto is an annulus 6 exteriorly screw threaded to engage the threaded wall of the opening in the tank. The upper edge of the annulus 6 projects beyond the body 2 and is circumferentially enlarged interiorly and at the juncture of the circumferentially enlarged portion with the lower portion a shoulder 7 is formed and the shoulder 7 is preferably disposed contiguous to the upper edge of the body, as clearly illustrated in Fig. 2 of the drawings. Resting upon the shoulder 7 and suitably secured thereto is a disk 8, while fastened to the upper surface of the disk 8 adjacent to the outer edge thereof is a partially circular row of contact segments 9, the contacts in the row 9 being arranged end to end and having the adjacent ends thereof insulated from one another as at 10. Also fastened to the upper surface of the disk 8 adjacent to the marginal edge thereof is a partially circular contact strip 11 arranged end to end with the end segments in the row 9 and describing, with the row of segments, a circle. 12 designates a vertical shaft having the lower end thereof journaled in the bearing depression 5 in the cross bar 4 and the upper end circumferentially reduced as at 13 and journaled in a bearing opening formed in the center of the disk 8 and projecting upwardly beyond the disk. This shaft 12 is preferably angular in cross section and surrounding the shaft is a float 14 constructed of some suitable material and adapted to move vertically relatively to the shaft as the level of the fluid in the tank varies. Secured to the cross bar 4 adjacent to the respective ends thereof and projecting upwardly from such bar are operating wires 15 extending through openings in the float 14 and having the upper end thereof secured to the under surface of the disk 8. These operating wires 15 are given a half twist from the lower end to the upper ends so that in the upward and downward movement of the float 14 the latter will be rotated by the wires and so impart a rotary motion to the shaft 12. Fixed upon the upper end of the shaft 12 is a bridging finger 16 having one end thereof working over the contact strip 11 and the other end working over the roll of contact segments 9. In the present instance, the finger 16 adjacent to each end thereof is formed with a recess and rotatably mounted within the recess is a wheel 17 and these wheels 17 roll over the strip 11 and the row of segments 9 respectively so as to eliminate friction between the finger and the contacts in the movement of the finger under the action of the shaft 12 and float 14. Formed on the inner wall of the outer end portion of the annulus 6 is a shoulder 18 and mounted upon the shoulder 18 is a transparent plate 19 which may be constructed of glass or other suitable material, while bearing against the edge of the plate 19 is a circular spring 20 engaging the inner surface of the annulus and acting to hold the plate upon the shoulder. This plate 19 protects the finger 16 and the contacts and at the same time enables the finger to be inspected whenever desired without the necessity of removing the plate.

Located in some convenient position, as, for instance, upon the dash board of the motor vehicle in which my apparatus is installed, is an indicator 21 which, in the present instance, comprises a cylindrical casing 22 having one end closed by a wall integral with the side wall and forming the bottom wall of the casing. Arranged within the casing 22 radially thereof and suitably spaced apart are electro-magnets 23 corresponding in number with the contact segments 9, while disposed centrally of the casing 22 is a shaft 24 upon which is mounted an armature 25 provided with a winding 26. The top of the casing 21 is closed by means of a transparent cover 27, while arranged beneath the cover 27 and suitably spaced apart therefrom is a disk 28 provided with indicating marks 29 adjacent to the periphery thereof and indicative of the positions of the float 14 in the tank. In the present instance, this disk 28 is formed with a segmental slot 30 and projecting through the slot 30 is one end of an indicating finger 31 fixed upon the shaft 24 and rotatable with such shaft. The end of the finger 31 above the disk 38 is movable over the latter to register with the indicating marks 29 thereon so that the level of the fluid in the tank may be ascertained. Arranged within the casing 21 and disposed adjacent to the magnets 23 is a bus bar 32. The corresponding ends of the magnets 23 are tapped onto the bus bar 32, as clearly illustrated in Fig. 4 of the drawings, while the remaining extremities of the magnets are connected with the corresponding contacts 9 respectively through the medium of conductors 33. 34 designates a battery or other suitable source of electrical energy and one side of the battery 34 is connected with the contact strip 11 by means of a conductor 35, while the other side of the battery is connected by way of the conductor 36 with the bus bar 32. The winding 26 of the armature 25 has one terminal connected with the bus bar by means of a conductor 37 and the other terminal connected through the agency of a conductor 38 with the side of the battery opposite from that to which the conductor 36 is connected. A suitable form of switch 39 is preferably located in the conductor 36 so that the apparatus may be thrown into and out of service whenever desired.

In this embodiment of my invention, I have shown a signal 40 mounted upon the casing 22 of the indicator and one terminal of the signal is connected to the bus bar, while the other terminal is tapped onto the conductor 33 by one of the electro-magnets 23, the signal being connected to the conductor 33 of a magnet which corresponds to a low level of the liquid in the tank so that the signal will be energized before the tank is empty, thereby enabling the attendant to replenish the tank. This signal may be either of the audible or visible type.

In practice, the circuit closer 1 is inserted in the tank and secured therein by means of the lower end portion of the annulus 6 and the body 1 of the circuit closer is preferably of a length equal to the depth of the tank so that the movements of the float will correspond to the fluctuations in the level of the liquid in the tank. As the float 14 in the tank rises and falls, such float is rotated by the operating wires 15, incident to such wires being arranged upon a half circle and in the rotation of the float a like motion is transmitted to the shaft 12, thereby rotating the bridging finger 16 over the row of contacts 9 and the strip 11. As each contact segment 9 is connected with the strip 11 the corresponding magnet 23 is energized with the effect to rotate the armature 25 to swing the finger 31 to a position corresponding to the position of the float and as the finger 31 is swung under the action of the magnets and the armature, such finger registers with the mark on the dial or disk corresponding to the level of the liquid in the tank.

It will be noted that the winding 26 of the armature 25 is at all times connected in circuit with the battery 34, when the apparatus is in service, and the magnets 23 present unlike poles to the armature so that the armature will respond instantly and positively to the magnets, thereby enabling an accurate reading to be obtained from the indicator at all times.

When the contact finger 16 bridges the strip 11 and one of the contact segments in the row 9, current flows from the battery 34, through the conductor 35, the strip 11, the finger 16, the segment 9 in engagement with such finger, the conductor 33, the magnet 23, the bus bar 32 and back to the other side of the battery by way of the conductor 36 and switch 39 in such conductor. The current for the winding 26 flows from one side of the battery 34, through the conductor 38, the winding 26, the conductor 37, the bus bar and then back to the other side of the battery by way of the conductor 36 and switch 39.

When the level of the liquid in the tank falls very low, the signal connected in shunt with the magnet corresponding to such low level is energized so as to warn the driver of the vehicle or other attendant of the condition of the liquid.

It will be seen that the foraminous body 1 permits the liquid to operate the float 14 and at the same time prevents any sediment or other foreign matter from entering the float chamber and interfering with the action of the float.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. A float actuated circuit closer comprising a foraminous body, an annulus on the upper end of said body whereby the circuit closer may be secured within a tank, a disk carried by said annulus, contact segments on said disk arranged in a partially circular row, a curved contact strip on said disk describing with said segments a circle, a vertical shaft in said body angular in cross section, a bridging finger on the upper end of said shaft for bridging said segments and strip, a float within said body slidably mounted upon said shaft, and operating wires having the lower ends thereof secured to said body and passed through said float and the upper ends secured to the lower side of said disk and arranged in such manner as to rotate the float in the sliding movement thereof whereby motion will be transmitted to the shaft and bridging finger.

2. A float actuated circuit closer comprising a foraminous body, an annulus on the upper end of said body whereby the circuit closer may be secured within a tank, a disk carried by said annulus, contact segments on said disk arranged in a partially circular row, a curved contact strip on said disk describing with said segments a circle, a vertical shaft in said body angular in cross section, a bridging finger on the upper end of said shaft for bridging said segments and strip, a float within said body slidably mounted upon said shaft, and operating wires having the lower ends thereof secured to said body and passed through said float and the upper ends secured to the lower side of said disk and twisted through a half circle whereby the float will be rotated in the movement thereof.

3. A float actuated circuit closer comprising contact segments arranged in a partially circular row, a curved contact strip describing with said segments a circle, a vertical shaft, a bridging finger on the upper end of said shaft for bridging said segments and strip, a float slidably mounted upon said shaft, and operating wires passed through said float and arranged in such manner as to rotate the float in the sliding movement thereof whereby motion will be transmitted to the shaft and bridging finger.

4. A device of the class described comprising a vertical shaft angular in cross section, a float slidably mounted upon said shaft having an opening therein corresponding in cross section to the cross sectional shape of said shaft, and operating wires spaced apart from said shaft and passed through said float and arranged in such manner as to rotate the float in the sliding movement thereof whereby motion will be transmitted to said shaft.

In testimony whereof I have hereunto set my hand in presence of two subscribing witnesses.

FREDERICK N. WINDRIDGE.

Witnesses:
 LOUIS A. STABLER,
 BENNETT S. JONES.